May 8, 1962 L. W. KLECKNER 3,032,988
JET REACTION TURBINE
Filed June 10, 1959 6 Sheets-Sheet 1

INVENTOR.
Loyal W. Kleckner
BY Christy, Parmelee & Strickland
ATTORNEYS

May 8, 1962 L. W. KLECKNER 3,032,988
JET REACTION TURBINE

Filed June 10, 1959 6 Sheets-Sheet 2

INVENTOR.
Loyal W. Kleckner
BY
christy, Parmelee & Strickland

ATTORNEYS

May 8, 1962 L. W. KLECKNER 3,032,988
JET REACTION TURBINE
Filed June 10, 1959 6 Sheets-Sheet 3

INVENTOR.
Loyal W. Kleckner
BY
Christy, Parmelee & Strickland
ATTORNEYS

May 8, 1962 L. W. KLECKNER 3,032,988
JET REACTION TURBINE
Filed June 10, 1959 6 Sheets-Sheet 4

INVENTOR.
Loyal W. Kleckner
BY
Christy, Parmelee & Strickland
ATTORNEYS

May 8, 1962 L. W. KLECKNER 3,032,988
JET REACTION TURBINE
Filed June 10, 1959 6 Sheets-Sheet 6

INVENTOR:
Loyal W. Kleckner
Christy, Parmelee & Strickland
ATTORNEYS

United States Patent Office 3,032,988
Patented May 8, 1962

3,032,988
JET REACTION TURBINE
Loyal W. Kleckner, Genoa, Italy
(XXV Aprile, 18, Pieve Ligure, Italy)
Filed June 10, 1959, Ser. No. 819,386
12 Claims. (Cl. 60—39.35)

The present invention pertains generally to a rotary engine which may be powered thermally, hydraulically or pneumatically. The basic construction of such an engine is a single stage jet propelled turbine. When the turbine is hydraulically powered a single stage is used. When, however, a gaseous medium is used, as where the turbine is thermally or pneumatically powered, multi-stage construction may be adopted for increased efficiency and extraction of maximum power for the selected type of propellant. In the basic design and modifications thereof the turbine is jet driven by means of the selected propellant issuing from axially arranged suitable nozzles in the turbine rotor stage.

One object of the invention is to provide a basic jet turbine design of rotary engine which may be of the horizontal or vertical type and may be adapted to thermal, hydraulic or pneumatic power by simple modification of the means for introduction of the selected propellant.

Another object of the invention is to provide a novel form of stage for a turbine rotor which may be used in single or multiple form in the rotor of the invention.

Another object of the invention is to provide a novel form of hydraulically actuated jet type turbine.

Another object of the invention is to provide a novel form of steam actuated jet type turbine.

A further object of the invention is to provide a novel form of combustible fuel actuated jet type turbine.

These and other objects of the invention will be made apparent from the following description and the drawings forming a part thereof wherein.

Referring now in detail to FIGS. 1 to 6 of the drawings showing a multi-stage steam turbine of the invention, the two-piece cast housing is comprised of a base portion 1 and a cover portion 2 which are connected by mating flanges 3 and bolts 3a. The housing portion 1 is provided with suitable flanges 4 adapted to mount the housing upon a suitable foundation, not shown, and is provided with openings 5 to receive the foundation bolts. The lower portion of housing 1 is open at 6 for exhaust of steam from the housing and is provided with suitable flanges 7 for attachment to a suitable steam exhausting duct, not shown, by means of fastening members inserted through the openings 8. An air foil 9 of suitable design deflects exhausting steam and assists in preventing carry-over within the housing. At the steam inlet end of the housing, a hub 10 is provided on both housing sections 1 and 2 and is braced by suitable ribs 11 and 12. The housing sections 1 and 2 at hub 10 are suitably bored at 13 to receive a fixed shaft 14 about the inner end of which a turbine rotor turns. At the outer end of fixed shaft 14 is a flange 15 which overlaps and is secured to the outer face of housing hub 10 by suitable means such as screws 17. Intermediate its ends, shaft 14 is provided with a circumferential flange 16. The end portion of housing hub 10 is disposed between said flanges 15 and 16 and retains the shaft 14 in fixed relation to the hub 10. The fixed shaft 14 is counterbored to receive the main steam nozzle 18 having a flange 19 thereon overlapping the flange 15 and is provided with suitable bolt openings 20 for attachment to the flange of a main steam line. The nozzle 18 is suitably bored at 20a providing an orifice for entrance of steam, the inner end of the orifice 20a being slightly undersized as at 21 to prevent over expansion of the steam entering the rotor chamber.

The rotor indicated generally by reference character 22 may be of the single or multi-stage type, as desired. That shown in FIG. 1 has two concentric stages, comprised of hollow steel cylinders 23 and 24 arranged concentrically and having their opposite ends suitably connected with hubs 25 and 26. Hubs 25 and 26 have suitable annular recesses 48a and 49a receiving the annular shoulders 48 and 49 of cylinders 23, 24. Suitable dowel pins 40 and bolts 27 connect said hubs and cylinders as shown. The hub 25 is bored at 28 for a running fit about the inner end of fixed shaft 14, and is connected with face 25a by diverging faces 25b. A counter-bore at 29 receives a radial bearing 30 engaging the fixed shaft 14. Bearing 30 is in effect a floating bearing held in place by a suitable retainer plate 31 and bolts 32. The hub 26, at one side, is conically projected inwardly of the rotor at 33 to disperse the propellant flowing axially of the rotor and at the other side is provided with an integral projecting shaft portion 34 serving as the turbine output shaft. The shaft 34 is received within the adjacent hub 35 of the upper and lower portions of the housing and the hub 35 is suitably bored at 36 to receive the shaft 34. The shaft 34 is provided with a suitable shoulder 37 against which is mounted the bearing 38 supporting the rotor in the housing hub 35. The hub 35 is suitably counterbored at 39 to receive the bearing 38.

Figure 3:
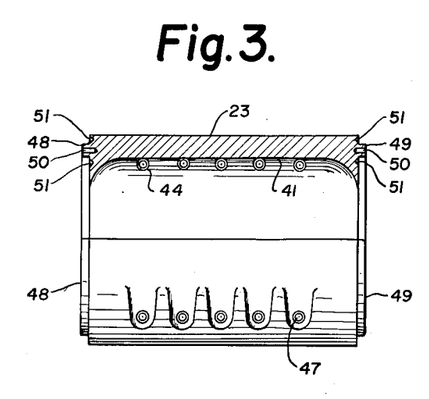
FIG. 3 shows partly in section and partly in elevation, a typical stage of the turbine rotor of the invention.
Figure 4:
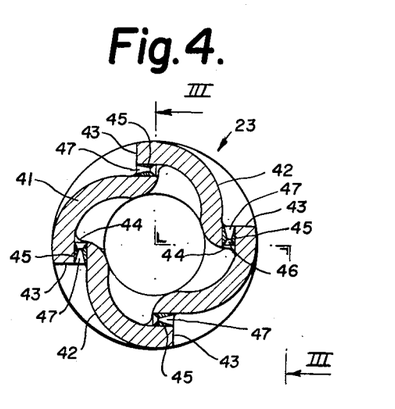
FIG. 4 shows a typical vertical cross-section through the stage.
Figure 5:
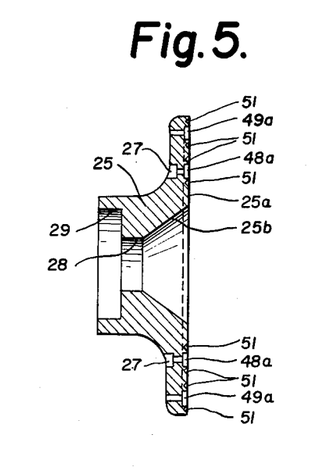
FIG. 5 shows a vertical cross-section through the turbine output shaft hub plate.
Figure 6:
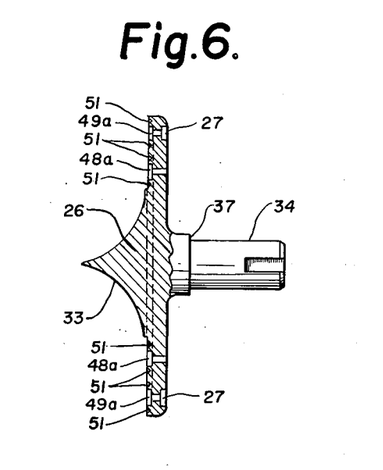
FIG. 6 shows a vertical cross-section through the turbine output shaft hub plate.

Rotor inner stage 23 is shown in detail on FIGS. 3 and 4 of the drawings as a typical stage. As shown therein, the stage is a generally cylindrical hollow member having a peripheral wall 41 with off-sets formed therein comprising the arcuate surface 42 and the flat surface 43 which is suitably bored at 44 to receive the nozzle 45. These nozzles 45 have converging openings 46 at their inner ends and diverging openings 47 at their outer ends. Nozzles 45 may be secured in place by any suitable means such as a press fit in the openings 44. When a multi-stage rotor is used, the stage 23 forms the inner most and similar successive stages are arranged concentrically thereabout. The nozzles 45 are preferably equally spaced longitudinally of the stage and the nozzle area of each successive outer stage is increased to accommodate the increased volume of expanding propellant. At the ends of each stage are provided suitable annular shoulders 48 and 49 corresponding to similar recesses 48a and 49a in the rotor end hubs 25, 26. The shoulders 48 and 49 are suitably drilled at 50 and tapped to receive machine screws or dowels as shown. V-shaped annular notches 51 are arranged in the end of the stages to receive suitable seals preventing leakage of steam or other propellant from within the stage.

Figure 1:
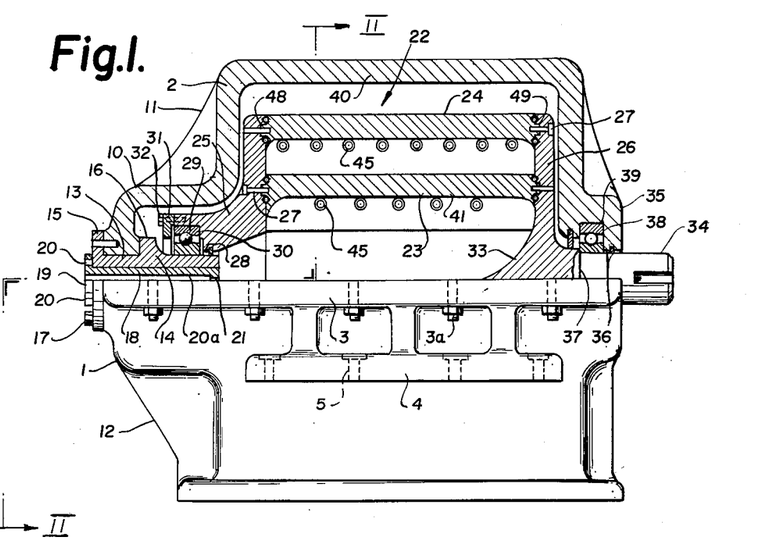
FIG. 1 shows in side elevation (partly in section) a multi-stage turbine of the invention adapted to use of steam as a propellant.
Figure 2:
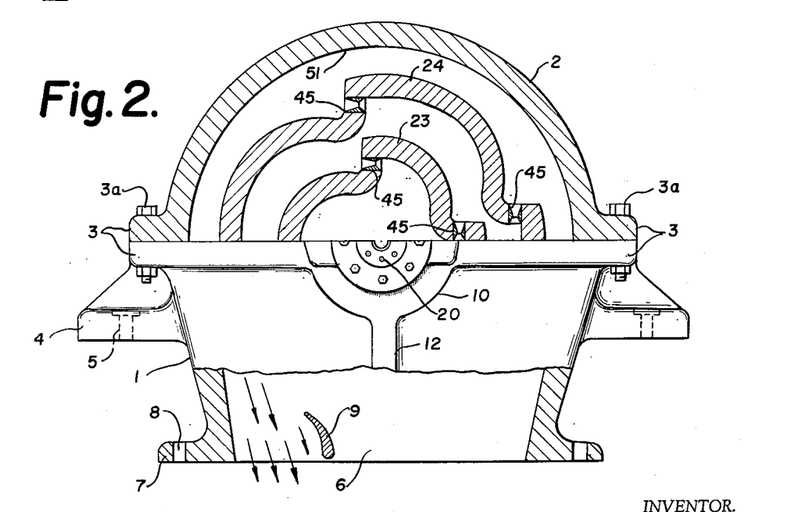
FIG. 2 shows a section taken on lines II—II of FIG. 1.

Referring now to FIGS. 1 and 2 of the drawing, it will be observed that the upper half 2 of the housing is closed above the rotor and the top wall of the housing is disposed in spaced relation to the outer wall of the stage 24 providing a passageway for steam moving out of the stages to pass downwardly through the openings 6 in the bottom half 1 of the housing for discharge of the exhaust steam. The air foil 9 assists in deflecting the discharging steam outwardly of the housing rather than to be drawn upwardly about the opposite side of the rotor.

The steam powered turbine of FIGS. 1 to 6 during operation has a steam supply line, not shown, attached to nozzle flange 19 by any suitable means, as by fastening members passing through openings 20 of flange 19. The steam entering the nozzle bore 20a and passing therefrom nozzle opening 21. The steam passes axially of stage 23 and engaging diverter flange 33 fills the interior of said stage. The steam having filled the interior of stage 23 and being under a suitable pressure from the steam supply line passes out of the stage through nozzles 45 into the next stage 24. The steam entering nozzle converging opening 46 and exiting through opening 47 imparts a radial thrust to the first stage causing the rotor 24 to revolve on fixed shaft 14 and radial bearing 39. The shaft 34 revolving with the rotor may be connected with any suitable mechanism such as a generator, gear reducer, blower, etc.

In a multi-stage rotor as in FIG. 1, the steam issuing from the nozzles of stage 23 fills the next stage. The steam issuing from each successive stage imparts further radial thrust to the rotor. Steam entering the first stage from nozzle 21 initially expands and upon passing out through the nozzles 45 into each succeeding stage, further expands before again passing out of the nozzles thereof. Thus there is a greater volume of steam entering each stage after the first and the nozzle area of each such successive stage must be increased to accommodate such increased volume. Steam leaving the final stage passes into the space between such stage and the adjacent wall of the housing and passing downwardly exhausts through the bottom housing opening 6 into the steam exhaust duct secured to the housing bottom flange 7. One or more aerofoils 9 deflect exhausting steam outwardly of the housing and prevent the spent steam from carrying over into the turbine.

Referring to FIGS. 7 to 11 inclusive, illustrating the hydraulically powered turbine, it will be noted that it is similar in construction to that of the steam powered turbine. The hydraulically powered turbine may also be either horizontal or vertical type. The total orifice area of the stage nozzles should be equal to the total area of liner 72 plus an amount required to prevent excessive back pressure in the rotor.

Figure 7:
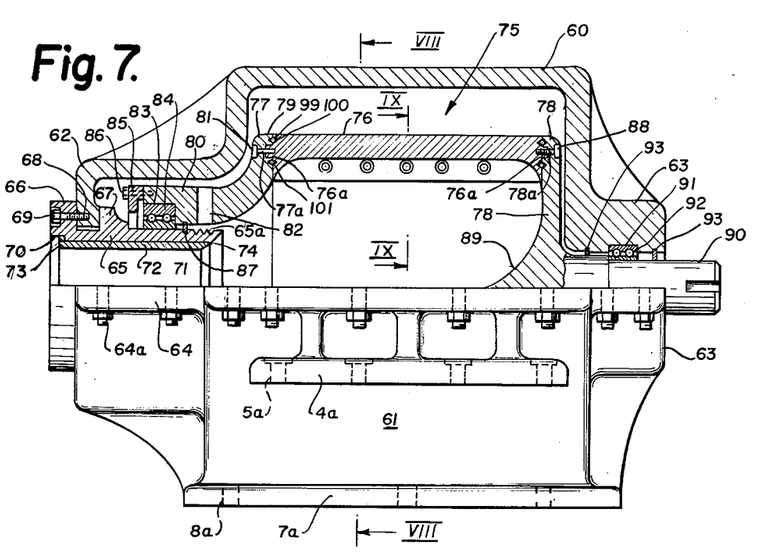
FIG. 7 shows in side elevation, partly in section, of the single stage turbine of the invention using a hydraulic propellant.
Figure 8:
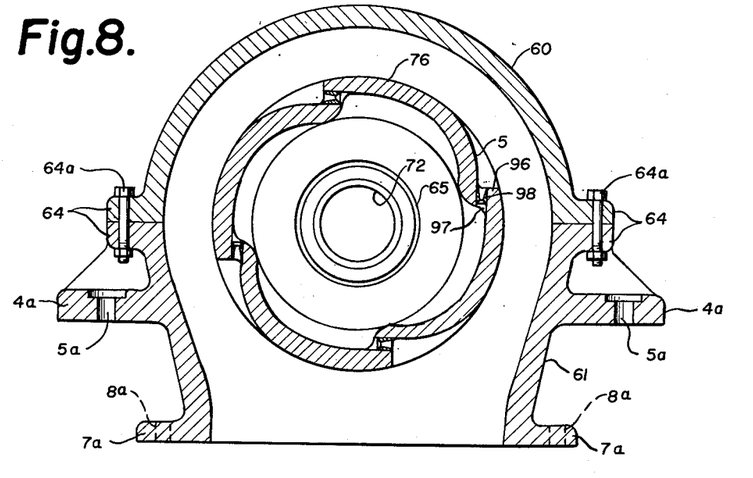
FIG. 8 shows a section taken on lines VIII—VIII of FIG. 7.

Referring now to FIG. 7 of the drawing, the upper housing half 60 and lower housing half 61 are quite similar in construction to the housing of FIG. 1. The housing is split longitudinally and both halves are provided with hub portions 62 and 63. The housing halves are connected by suitable mating flanges 64 and bolts 64a as in FIG. 1. The fixed shaft 65 is provided with an outer peripheral flange 66 and an inwardly spaced peripheral flange 67 between which are received the depending flange portion 68 of the hub 62. The flange 66 of the fixed shaft is secured to the portion 68 of the hub 62 by means of suitable fastening members 69.

The outer end of the fixed shaft is counterbored as at 70 and longitudinally bored as at 71 to receive the sleeve 72 having a flange 73 seated in the counter-bore 70. The inner ends of the sleeve 72 and the fixed shaft are chamfered as at 74 to minimize fluid disturbance upon issuing from the bore of the liner 72. Adjacent the inner end of the shaft 65, several annular rings 65a are turned on the outside diameter of shaft 65. The relation of the bore of hub plate 77 to the outside diameter of shaft 65 from the chamfered end of 65 back to and including the annular ring 65a is a running fit. This will permit a certain amount of leakage along said shaft to the annular rings.

Figure 9:
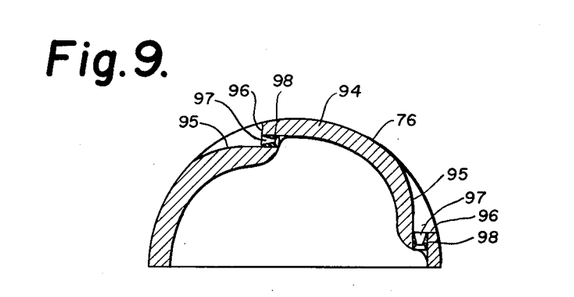
FIG. 9 shows a cross-section through the stage on line IX—IX of FIG. 7.
Figure 10:
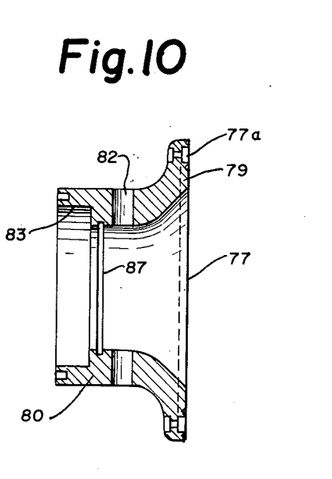
FIG. 10 shows a cross-section through the fixed shaft hub plate.
Figure 11:
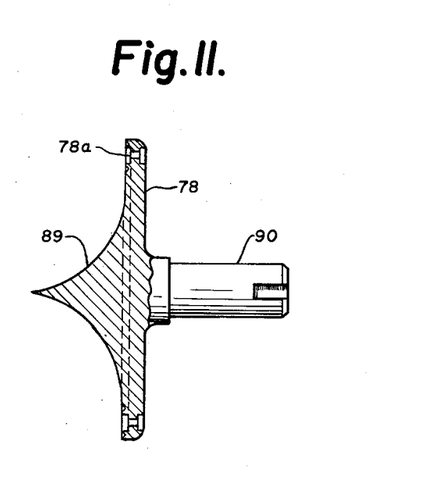
FIG. 11 shows a cross-section through the output shaft hub plate.

The rotor 75 is comprised of the single stage 76 having the flanged plates 77 and 78 at opposite ends thereof. The end plate 77 comprises a flange 79 and a hub portion 80 extending therefrom. The flange 79 is secured to the stage 76 by a suitable annular recess 77a receiving the stage shoulder 76a through which pass the bolts 81. Within the hub portion 80 are a series of radially arranged openings 82 extending through the sub 80 and overlying the rings 65a adjacent the inner end of the fixed shaft 65. These radial openings 82 during operation of the rotor serve to exhaust any fluid leakage along shaft 65. The end portion of hub 80 is counter-bored at 83 to receive a radial bearing 84 mounted on the fixed shaft 65. This bearing is held in place by means of a retainer plate 85 having machine screws 86 extending therethrough into the end of hub 80. Intermediate the bearing 84 and the radial openings 82 is a suitable seal 87. Referring now to the end hub plate 78 at the opposite side of stage 76, it is secured to the stage by means of an annular recess 78a receiving the stage shoulder 76a through which pass suitable bolts 88. Extending inwardly of plate 78 is a hub portion 89 and extending outwardly from the opposite face of the member 78 is an integral shaft 90. The hub sections 63 of the housing are suitably counter-bored to receive the shaft 90 and are likewise counter-bored at 91 to receive the bearing 92. At opposite sides of the bearing 92 are suitable seals 93 excluding dirt from the inside of the housing. The stage 76, as shown in FIG. 9 is similar in construction to that of FIG. 3 and comprises a generally hollow cylindrical member 76 having a peripheral wall 94 with offsets formed therein comprising the arcuate surfaces 95 and the flat surfaces 96 which are suitably bored at 97 to receive the nozzles 98. Suitable tapped openings 99 are in opposite faces of the stage 76 at shoulders 76a for reception of the bolts 81. Suitable annular grooves 100 are formed in opposite faces of stage 76 and the adjacent faces of the members 78 and 79 for reception of seals 101 preventing leakage of water.

Operation of the hydraulically actuated turbine of FIGS. 7 to 11 inclusive will now be described. Water under pressure is admitted to the sleeve 72 and passes into the stage 76. By reason of the beveled edges 74 of the sleeve and fixed shaft the water flows into the stage without substantial disturbance and flows axially onto surface 89 at the opposite end of the stage so as to be diverted radially. After the stage 76 is filled with water, pressure from the penstock ejects water from the nozzles 98 causing rotation of the rotor 75. The exhausting water passing into area between the stage and housing moves around the housing and outwardly through the bottom opening as in FIG. 1. Pressure of the water within the stage will cause some water to pass over the inner end of the fixed shaft 65 and will be exhausted through the radially spaced openings 82 of the stage hub 77. Seal 87 will prevent passage of the water axially of shaft 65. At the opposite end of the stage 76, seal 93 prevents passage of water outwardly of the housing.

Referring now to FIGS. 12 to 15 of the drawings, wherein a combustible fuel application of the invention is disclosed, the two-stage rotor is the same as shown in FIGS. 1 to 6 but the remainder of the turbine is adapted for use of combustible fuel.

Figure 12:
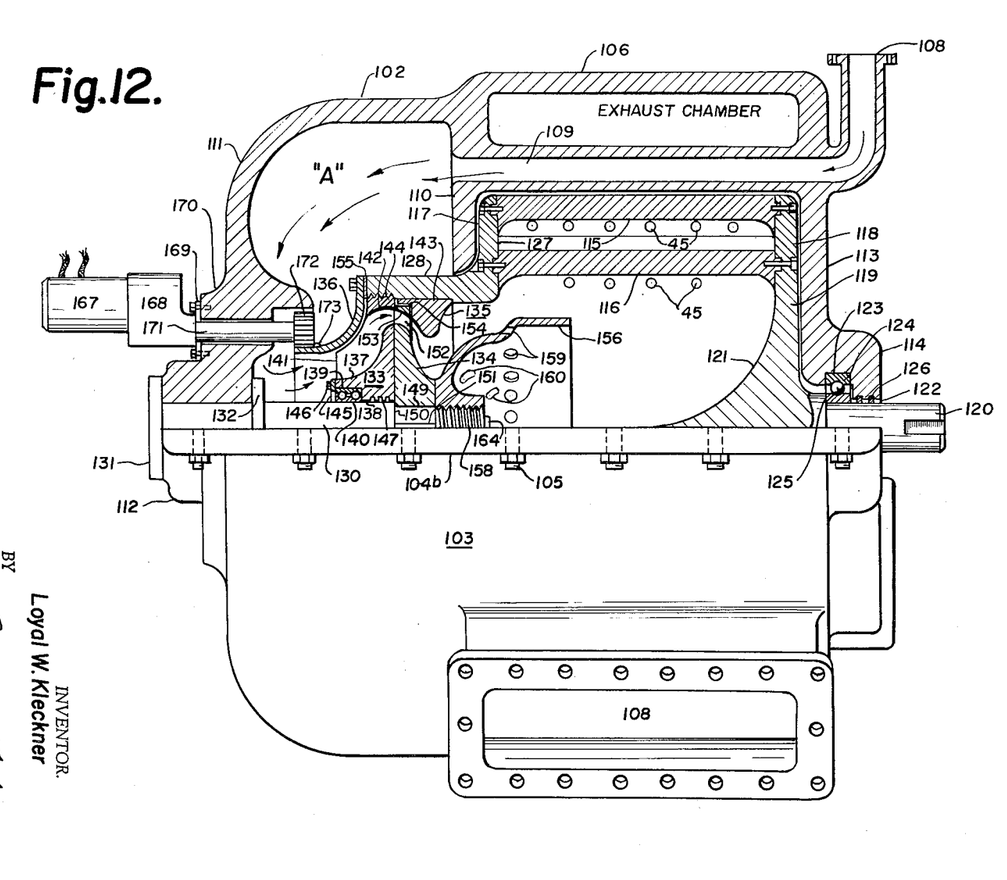
FIG. 12 shows a side elevation, partly in section, of the multi-stage turbine of the invention using combustible fuel as a propellant.
Figure 13:
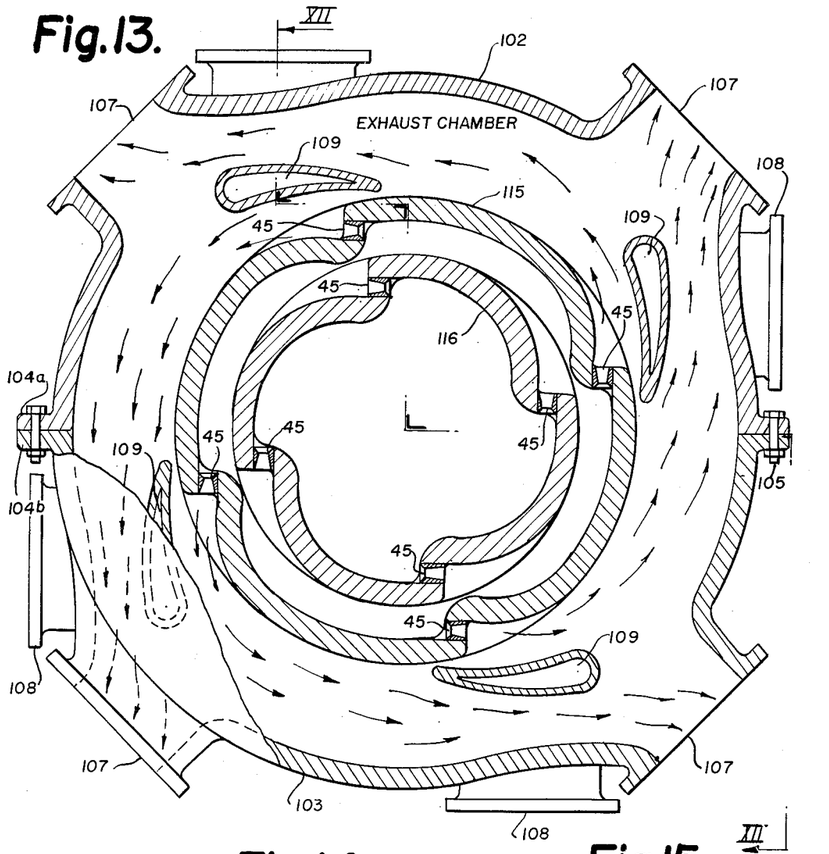
FIG. 13 shows an end elevation, partly in section, taken on lines XIII—XIII of FIG. 12.

As shown in FIGS. 12 and 13, a two-part housing comprises an upper half 102 and a lower half 103. The lower half 103 is provided with any suitable form of base (not shown). Each housing half has a suitable flange 104a and 104b, respectively, provided with suitable apertures therein receiving connecting bolts 105. Each housing has, in the peripheral wall 106 thereof, spaced exhaust outlet openings 107 to which may be attached suitable exhaust ducts (not shown) for collecting and disposing of exhaust gases. Also extending through each housing peripheral wall are air inlet openings 108. Each inlet opening 108 has connected therewith an air duct 109 which may be integrally cast with the housing and extends within the housing from the inlet opening to an apertured curtain wall 110 in spaced relation to the housing peripheral wall 106.

Each housing half 102, 103 is provided with an arcuate front wall 111 which terminates in a hub portion 112, and a rear wall 113 which terminates in a hub portion 114. Within the housing and adjacent housing rear wall 113 is a rotor comprised of two hollow concentric spaced stages 115 and 116 which are of the same general design as shown in FIGS. 1 and 2. The outer stage 115 has its periphery in spaced relation to the air ducts 109 and its ends connected to the stage hubs 117 and 118. The inner stage 116 is concentric with and smaller in diameter than the outer stage 115 so as to have its periphery in spaced relation to the peripheral wall of stage 115. Stage 116 also has its ends connected with the stage hubs 117 and 118 for simultaneous rotation therewith. Hub 118 comprises a flange portion 119 upon whose outer face is a shaft portion 120 and upon whose inner face is an arcuate diffuser portion 121. Shaft 120 extends outwardly of the adjacent housing hub 114 which is bored at 122 to receive same and counter-bored at 123 to receive bearing 124 mounted on shaft 120 adjacent shoulder 125 thereof. Suitable dust seals 126 are mounted on the shaft 120 and housing hub 114. Hub 117 comprises a flange portion 127 and a hollow outwardly extending portion 128. Flange portion 127 of hub 117 and flange portion 119 of hub 118 are provided with suitable annular recesses receiving the annular shoulders of the stages as shown and described in regard to the stages and hubs of FIGS. 3, 5 and 6. Portion 128 of hub 117 is supported on the fixed shaft 130 as hereinafter discussed.

The hub portions 112 of each housing half section 102 and 103 are bored to receive a fixed shaft 130 which extends inwardly of the housing. A flange 131, on shaft 130, overlaps the front face of hub 112 and a second flange 132 overlaps the inner face of the housing, as shown in FIG. 12, to retain the shaft in fixed relation upon the housing. Inwardly of flange 132, a conventional type centrifugal air compressor encloses shaft 130 and comprises an air impeller 133, fixed air diffuser 134, air deflector ring 135 and shroud 136.

The impeller 133 is comprised of a hub portion 137 which is provided with a central bore 138 to freely pass shaft 132 and is counter-bored at 139 to receive a radial and thrust bearing 140 having a sliding fit therein and mounted on shaft 130. Radially spaced about one face of said hub 137 are the blades 141 which extend above hub 137 and at their periphery are connected by an annular ring portion 142. The hub portion 128 is counter-bored at 143 and is threaded to receive the threads 144 formed on the outer face of the impeller ring portion 142. When the impeller is screwed into place on hub portion 128 and bearing 140 is in place, the impeller rotates with hub 128 of the rotor and is supported upon fixed shaft 130 by bearing 140. A suitable bearing retainer plate 145 is secured by suitable machine screws 146 to impeller hub 137. Suitable seals such as at 147 may be also mounted in impeller hub 137 and engage shaft 130 as shown. The annular shroud 136 is mounted on hub portion 128, outwardly of said impeller, and secured in place by machine screws 148 for concurrent rotation with the impeller. A suitable gasket 155 seals the joint between the shroud and impeller.

Shaft 130 is reduced in diameter at 149 to provide a shoulder 150 against which is mounted the fixed diffuser 134 and secured in place upon the shaft 130 by suitable keys or splines 151. The vanes 152 of the diffuser 134 are connected by a peripheral ring 153. The deflector ring 135 is a circular hollow member having its periphery slidably mounted in the counter-bore 143 of rotor hub 128 and is off-set at 154 to overlie the outer and side faces of the vanes 152 and in spaced relation thereto. A suitable shroud 156 is provided with a hub portion 157 having internal threads which are engaged by the threaded end portion 158 of fixed shaft 130 with the hub abutting the adjacent face of fixed diffuser 134. Suitable apertures 159 and 160 are spaced radially about the periphery of shroud 156 for admission of air for combustion of fuel as hereinafter discussed.

Figure 14:
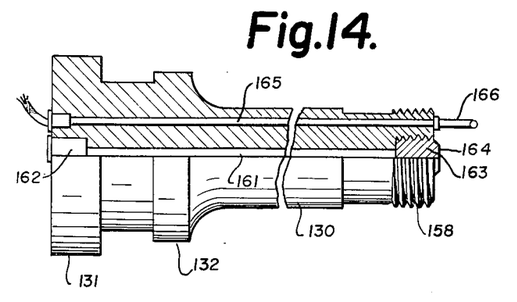
FIG. 14 shows the fixed shaft of the invention, partly in vertical section.
Figure 15:
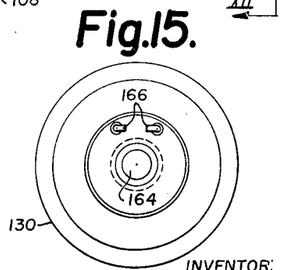
FIG. 15 shows an end elevation of the fixed shaft of FIG. 14.

As shown in FIGS. 12 and 14, the fixed shaft 130 provides for admission of and firing of the combustible fuel for driving the turbine rotors 115 and 116. The longitudinal central opening 161 is counter-bored at 162 for connection of a fuel line (not shown) and at 163 to receive a fuel atomizing nozzle 164. A second longitudinal opening 165 in shaft 130 receives the ignition system wiring for activating spark plugs 166. The end portion of shaft 130 projecting into the shroud 156 contains the spark plugs 166 and fuel nozzle 164.

Referring now to FIG. 12, the multi-stage rotor therein must be initially rotated until sufficient pressure of combustion gases is developed to rotate same. One suitable means for such initial rotation may be provided by an electric motor. An electric motor 165 and a suitable gear case 168 may be mounted by means of a suitable bracket 169 upon a pad 170 upon the outer face of housing wall 111. The machine screws 171 serving to retain bracket 169 in place. Pad 170 has a suitable opening therein to receive a driving shaft 171 connected at one end to the gear case 168 and at the opposite end having a driving gear 172 thereon. A suitable driven gear, such as 173, mounted on the periphery of shroud 137 serves to rotate the rotor through rotor hub 128. By any suitable well known means, the shaft 171 and gear 172 may be slidably mounted so as to engage with shroud gear 173 upon actuation of the motor 167. After the rotor picks up speed and the torque load on shaft 171 is reduced, the shaft 171 may then be retracted and the motor 167 stopped.

Referring now in detail to the operation of the turbine of FIGS. 12 to 15, the turbine rotor is started into rotation by motor 167 acting through gear casing 168 and driven gear 172 to rotate gear 173 mounted on the compressor shroud 136 which in turn is integrally connected to the rotor through hub portion 128. After the rotor has obtained a suitable r.p.m., fuel is injected into opening 161 and is atomized by nozzle 164 which discharges into shroud 156 and is ignited by spark plugs 166. Rotation of the rotor causes the compressor impeller 133 to withdraw air from chamber A, compress and discharge same through diffuser 134 and deflector ring 135 so as to pass over shroud 156 in passing into rotor stage 115. The air passing over shroud 156 also enters the latter through openings 159 and 160 to support combustion of fuel from nozzle 164 and pass inwardly of the rotor where fuel combustion is completed and the gases are diverted annularly by surface 121 of the hub plate 113 towards the periphery of inner stage 116. The combustion gases build up pressure within stage 116 and passing outwardly therefrom through nozzles 45 thereof into stage 115 as gas pressure builds up in stage 116, the gases are ejected downwardly through the nozzles 45 therein into the main exhaust channel. The combustion gases issuing from nozzles 45 of inner stage 115 expand and impart a rotary thrust to stage 116. The combustion gases are under compression on the interior of stage 115 issuing from nozzles 45 of this stage and expanding into exhaust channel, also imparting a rotary thrust to stage 115. The exhaust gases in the exhaust channel in passing to an adjacent exhaust outlet 107 pass over air ducts 109 and heat same. The incoming air is warmed during passage through these ducts 109 and upon further heating during compression in the air compressor, aid in combustion of the fuel from nozzle 164. As is usual in such turbines the rate of feed of fuel determines speed of the rotor by reason of the increased pressure of combustion gases within the stages 115 and 116.

It will be apparent to those skilled in the art that the steam or combustible fuel powered rotators may be single stage, but are preferably multi-stage for greater efficiency. The number of stages may, therefore, be one, two or more depending upon design. Nozzles of the converging-diverging type are preferable but the nozzles may be of any other suitable design. The nozzle area of each stage must, of course, increase over that of the preceeding stage to accommodate the increased gas volume of the succeeding stages.

It will be likewise apparent to those skilled in the art that many changes in details of construction may be made without departure from the basic design. Therefore, it is to be understood that any details of construction shown and described are for purposes of illustration and not limitation, except as necessitated by the scope of the appended claims.

I claim:

1. In a turbine of the character described, in combination, a housing having a generally cylindrical mid-portion, hubs at opposite ends of the housing, a rotor disposed within said housing in spaced relation thereto, said housing being split longitudinally thereof along the axis of said rotor, each said housing hubs having a bored opening therethrough in alignment with said rotor axis, a hollow fixed shaft disposed in one of said hub openings and extending inwardly of said housing, one end of said rotor being rotatably mounted on said fixed shaft, the opposite end of said rotor having a cylindrical extension thereof disposed in the adjacent bored hub opening and extending therethrough outwardly of said hub, said rotor intermediate the ends thereof being of elongated hollow cylindrical cross-section, a plurality of rows of longitudinally spaced jet openings arranged radially about said rotor cylindrical portion, means on said fixed shaft for introducing a pressurized propellant into said rotor and exhaust means on said housing for said propellant leaving said rotor.

2. The turbine as defined in claim 1, wherein said rotor comprises a hollow cylindrical mid-portion and end walls at opposite ends of said mid-portion, the periphery of said mid-portion being provided with a plurality of longitudinally extending indentations radially spaced about the axis of rotation of the rotor, each said indentation being provided with a flattened portion extending inwardly from the periphery of the rotor, said flattened portion having said longitudinally spaced jet openings therein connecting the interior and exterior peripheries of the rotor.

3. The turbine as defined in claim 1 wherein the rotor is comprised of a hollow cylindrical cast member, a hub plate secured to one end of the cylindrical member closing the adjacent end thereof, a hollow outwardly extending portion on said hub plate receiving the fixed shaft, a hub plate secured to and closing the other end of said cylindrical rotor member, a conical extension at one side of said latter hub plate and disposed within said rotor for diffusion of the pressurized propellant flowing axially thereof, and a solid cylindrical extension on the other side of said latter hub plate extending longitudinally through the adjacent housing hub and rotatably supported therein.

4. The turbine as defined in claim 3 wherein the rotor is comprised of a plurality of concentrically arranged spaced hollow cylindrical members disposed between and secured to said hub plates, each said hollow cylindrical members having said radially disposed longitudinally extending rows of jet openings therein, the total of said jet openings in each said concentric cylinders outwardly of the innermost cylinder being larger than that of the adjacent inner cylinder.

5. The turbine as defined in claim 3 wherein the rows of jet openings are disposed within indentations at the circumference of the cylinder with convergent-divergent nozzles disposed in said openings, the longitudinal axis of each said openings being at right angles to the said axis of the adjacent row of openings.

6. In a hydraulically powered jet turbine, in combination, a housing having a hollow mid-portion adapted for reception of cylindrical rotor and split longitudinally at the axis of rotation of the rotor, outwardly extending hollow hub portions at opposite ends of said housing at the said axis of rotation, a cylindrical fixed shaft in one of said hubs concentric with said axis of rotation and having a portion of its periphery in spaced relation to the inner face of said hub, a hollow cylindrical rotor mounted in said housing mid-portion in spaced relation to the walls of said mid-section, a hub plate conforming to the periphery of one end of the rotor and secured thereto, a hollow cylindrical extension at one side of the hub-plate extending within the adjacent housing hub in spaced peripheral relation thereto and in over-lapping relation to said fixed shaft, a bearing member mounted within the outer end of the hub extension rotatably supporting the hub plate upon the fixed shaft, radially spaced openings in said hub plate extension and extending about the inner end of the fixed shaft for exhausting water from the rotor flowing over the end of the fixed shaft, a hub plate at the opposite end of said rotor having a peripheral portion conforming with and secured to the adjacent end of the rotor, a conical extension at one side of the latter hub plate extending into the rotor with the base portion of the conical extension formed integral with the hub plate and of a diameter substantially that of the inside diameter of the rotor, a cylindrical extension on the opposite face of said hub plate extending outwardly through the adjacent housing hub, a bearing rotatably supporting the latter extension in said housing hub, radially disposed longitudinally extending rows of jet openings in the periphery of said rotor, a water supply tube extending longitudinally within said fixed shaft for introduction of hydraulic pressure into said rotor, and an opening in said housing for exhaustion of water flowing through said jet openings.

7. In a turbine of the type having a rotor actuated by expansion of gaseous pressurized propellants injected into said rotor, comprising a housing having at least one opening therein for discharge of spent propellant, a fixed rotor supporting shaft extending inwardly through one end of the housing and supported therein, means at the opposite end of the housing forming an opening therein in axial alignment with said fixed shaft, a plurality of concentrically arranged spaced hollow cylindrical rotor stages within and in spaced relation to said housing, means secured to one end of each said concentric stages and having a hollow end portion journaled on said fixed shaft, a second means secured to and closing the opposite ends of said concentric stages and having a cylindrical end portion journaled in said housing in axial alignment with said fixed shaft and projecting through said housing opening, a plurality of longitudinally arranged series of nozzle openings extending through the peripheral wall of each said stage and spaced radially about the periphery of each stage nozzles in each said nozzle openings, the orifice area of the nozzles of the inner stage being less than the nozzle orifice area of each successive outer stage, and means extending axially through said fixed shaft for injecting gaseous fluid into the interior of the innermost of said stages.

8. The turbine as defined in claim 7 wherein said nozzles are of the type having convergent-divergent orifice openings.

9. The turbine as defined in claim 7, wherein the nozzle openings in each said stages are displaced laterally inward from the main peripheral plane of the stage and the nozzles therein for each series of nozzle openings are disposed at substantially right angles to each adjacent series.

10. The turbine as defined in claim 9 wherein the said fixed shaft is retained in axial fixed relation to said housing and the means supporting the adjacent end of the rotor thereon comprises an annular plate-like member secured to the adjacent ends of the rotor stages and having an annular hollow extension therefrom enclosing the adjacent end of the fixed shaft and supported thereon by a radial bearing mounted upon said fixed shaft.

11. The turbine as defined in claim 10 wherein the housing has an apertured curtain wall across the end of the rotor adjacent said fixed shaft and in spaced relation to the adjacent housing end wall providing an annular air chamber, air inlet openings in said housing adjacent the opposite end of the housing, air ducts within said housing connecting said inlet openings with said air chamber and disposed between the periphery of the rotor and the adjacent housing wall, means mounted on the said annular hollow extension enclosing the fixed shaft for withdrawing air from said air chamber and after compressing same discharging it into the interior of the innermost rotor stage, and ignition means on the innermost end of the fixed shaft for firing the mixture of air and gaseous fuel in the innermost rotor stage.

12. The turbine as defined in claim 11 wherein a hollow annular shroud is secured to the innermost end of the fixed shaft and radially arranged apertures therethrough for passage of compressed air from the said compressor for initial mixing of the air and gaseous fuel.

References Cited in the file of this patent

UNITED STATES PATENTS

| | | |
|---|---|---|
| 762,175 | Lees | June 7, 1904 |
| 966,363 | Samoje | Aug. 2, 1910 |
| 1,108,497 | Gridley | Aug. 25, 1914 |
| 1,270,808 | Franklin | July 2, 1918 |
| 1,945,608 | Hill | Feb. 6, 1934 |
| 2,188,128 | Armstrong | Jan. 23, 1940 |
| 2,736,369 | Hall | Feb. 28, 1950 |
| 2,865,168 | Zillman | Dec. 23, 1958 |

FOREIGN PATENTS

| | | |
|---|---|---|
| 427,778 | France | June 3, 1911 |
| 808,525 | France | Nov. 14, 1936 |

UNITED STATES PATENT OFFICE
CERTIFICATE OF CORRECTION

Patent No. 3,032,988

May 8, 1962

Loyal W. Kleckner

It is hereby certified that error appears in the above numbered patent requiring correction and that the said Letters Patent should read as corrected below.

Column 1, lines 17, 19, 25, 40, 53 and 64, column 2, line 50, column 3, lines 3 and 11, column 7, line 70, and column 8, line 54, for "propellant", each occurrence, read -- propellent --; column 8, line 52, for "propellants" read -- propellents --; column 3, lines 26 and 27, after "therefrom" insert -- at --; column 4, line 22, for "sub" read -- hub --.

Signed and sealed this 28th day of August 1962.

(SEAL)
Attest:

ESTON G. JOHNSON
Attesting Officer

DAVID L. LADD
Commissioner of Patents